United States Patent Office 3,146,184
Patented Aug. 25, 1964

3,146,184
WAX COMPOSITION
Hallard C. Moyer, Homewood, Ill., and Eugene M. Fauber, Hammond, Ind., assignors, by mesne assignments, to Sinclair Research, Inc., New York, N.Y., a corporation of Delaware
No Drawing. Filed Jan. 30, 1961, Ser. No. 85,466
3 Claims. (Cl. 208—21)

This invention relates to crystalline waxes derived entirely from petroleum, and of such composition that certain desirable properties can be realized. More particularly it relates to crystalline petroleum waxes which exhibit improved gloss and improved gloss stability when coated on paper, paperboard, or other sheet material under conditions normally conducive to good gloss.

The major portion of paraffin wax produced today is consumed by the food industry as a material for coating, impregnating, or laminating paper, paperboard or other sheet materials. These paper materials are usually used as wrappers, bags, cartons, cups, tubs, or other style of container or covering for perishable goods. In order to perform effectively in these various specialized end uses it is highly desirable that the composition of paraffin waxes be so controlled that a wax intended for a specific type of usage will afford the properties required for that usage. In those cases where a wax is used as a surface coating, or as a combined surface coating and impregnant, it is often desirable that the wax film exhibit high gloss and, further retain this high gloss for as long a period as may be dictated by circumstances. For example, wax may be used to coat the outer wrapper on a carton of food which is offered for sale in a retail food store. The waxed wrapper usually serves several functions. It minimizes passage of water vapor into or out of the packaged food, thus prolonging storage life or useful shelf life. The printing on the wrapper identifies the product. Gloss imparted by the waxed film enhances the appearance of the wrapper, amplifies colors in the printed design, and increases sales appeal of the product. Good gloss increases the attractiveness and sales appeal of such diverse items as waxed paperboard cartons for butter and bacon, paper bags for potato chips, and waxed paper for general household purposes.

In the various uses where good gloss is desirable, it is usually important that the wax film have certain other properties including adequate resistance to blocking and scuffing, and lowest possible water vapor permeability. Good sealing strength, paper penetrability, and translucency also may be important attributes of the wax. Thus, in devising a wax of improved gloss and gloss stability, it is highly advantageous if other desirable properties are not sacrificed. As will be evidenced, desirable properties need not be sacrificed in the compositions of this invention.

In considering gloss characteristics of paraffin wax, a wax must be examined with respect to two features: initial gloss and gloss stability. Of the two, gloss stability usually is the more difficult to obtain. Assuming that a suitable paper or paperboard substrate is used, many paraffin waxes can be applied by conventional waxing methods to give a film of good initial gloss. Unfortunately, those waxes having unusually good initial gloss usually exhibit poor gloss stability, so that the glossy film becomes hazy, dull, or blotchy after a few days or weeks of aging. Conversely, other waxes may exhibit fairly good stability, but lack the desired luster initially. Still other waxes are deficient both as to initial gloss and gloss retention. Except for a few generalizations which have been generally accepted throughout the industry in recent years, the few published explanations offered for the perverse gloss behavior of paraffin waxes have not been substantiated by enough evidence to justify acceptance. It is generally recognized, for example, that very narrow range n-paraffinic waxes having a melting point of about 145° F. or less do not afford good initial gloss. It is also generally known that very soft or low melting waxes do not afford good gloss stability. It is also the belief of many that wax gloss behavior is predetermined to a considerable degree by the nature of the particular petroleum from which the wax is derived. However, there has been no generally accepted set of rules or directions for preparing a high quality paraffin wax, suitable for typical paper or paperboard waxing operations, which will exhibit good initial gloss and good gloss stability. The composition of this invention now appears to be a practical answer to this problem.

In the waxing of paper or paperboard, various techniques, waxing conditions, and types of machines are used to obtain maximum gloss. Naturally, the choice of equipment and conditions of operation are largely dependent on the particular job to be done. The various techniques which can be successfully used are well known to those concerned and they will not be described here, except to comment on the following critical features common to all. Regardless of the details of the operation, a film of molten wax is applied and this film is quenched or cooled very rapidly to a temperature well below the wax secondary transition temperature, usually to room temperature or below. This solidifies the wax while the molecules are still in a relatively unoriented state much as exists in the molten phase. Some crystal growth takes place, of course, but growth of individual crystals is greatly restricted. This results in a relatively amorphous, glasslike film of good transparency which exhibits relatively high gloss provided it has been laid down in sufficient thickness and on the proper quality substrate. After the glossy wax film has been laid down on the substrate, some recrystallization commences. The nature of this recrystallization determines whether the wax film will exhibit good or poor gloss stability.

Most paraffin waxes of commerce which are used for surface coatings, or combined impregnations and surface coatings, in applications where gloss is important are predominantly n-paraffinic in composition. This is particularly true of those waxes having a melting point within the range of about 132–142° F. It is necessarily true for most commercial waxes of this melting range because a high non-normal paraffin content would not permit the degree of hardness, blocking resistance and scuff resistance typically required. While a high normal paraffin content is necessary and desirable for these reasons, it does not insure good gloss properties. If it did, there would be no serious gloss problems, as a very highly n-paraffinic wax 132–142° F. melting point is not difficult to prepare from most mixed-base, of Mid-Continent type petroleums.

To improve gloss properties of the so-called paraffin waxes it has become widely practiced, by those concerned, to add to the wax a minor amount of a foreign material, usually a polymeric hydrocarbon, and most commonly a relatively low molecular weight polyethylene. This provides a very satisfactory answer to the problem in some cases. However, in other instances, addition of a polymer to paraffin wax may not be acceptable because of such reasons as the following: a separate and sometimes difficult blending operation is required, costs are increased, the resulting viscosity increase may not be tolerable, the resulting blend may not remain uniform in composition at all temperatures unless agitated, paper penetrability will be markedly reduced, and water vapor permeability of the film may be increased excessively. It is obviously desirable that the wax manufacturer be able to produce paraffin wax of good gloss properties and, further, that he be able to do this without introducing materials foreign to the particular petroleum distillate streams from which the wax in question is produced. One of the advantages of this invention lies in permitting this very desirable feature.

It has now been found that paraffin waxes of improved gloss and gloss stability can be produced by combining a select normal or straight chain paraffin wax with a minor amount, say about 0.5 to 10% by weight, preferably about 2 to 8%, of a select isoparaffinic wax. The isoparaffinic wax is added in an amount sufficient to provide a wax composition of improved gloss and gloss stability. No apparent need has been found for adding over about 10% by weight of the isoparaffinic wax.

The general methods by which refined crystalline paraffin waxes, both of the normal or straight chain type and the isoparaffinic or non-straight chain type, are produced from crude petroleum are well known by virtue of many publications and will not be described in detail here. Ordinarily the waxes are removed from the heavier distillate fraction of petroleum by some type of low temperature separation usually a so-called solvent dewaxing process. The distillates may or may not be dearomatized prior to dewaxing. The resulting slack waxes are further processed to remove oil and low melting components by solvent deoiling or sweating or by a combination of these methods. These sweating and/or deoiling operations normally employed act to concentrate the hard, normal paraffinic waxes and eliminate softer, isoparaffinic type waxes as well as oil. Sweating involves fractionally melting and fractionally dissolving a mixture of wax or wax and oil molecules. For paraffin wax molecules having a given number of carbon atoms, the straight chain, or normal, configuration exhibits a higher melting point than any of the multitude of non-normal configurations which are possible. The exceptions to this statement are so few as to be inconsequential. Thus, at a given sweating temperature, non-linear molecules will melt and drain away while linear molecules of the same molecular weight may remain unmelted. Even if not actually melted, isoparaffinic molecules, being less firmly bound by crystalline forces than are their n-paraffinic counterparts, are more readily extracted from the wax mass by the molten phase. Thus, the further the sweating process is carried, the more n-paraffinic is the remaining wax yield.

In solvent deoiling operation, the situation is analogous. At a given temperature the non-linear molecules, both oil and wax, tend to remain dissolved in the solvent while the corresponding linear wax molecules— and even those of somewhat lower molecular weight— crystallize from solution to be recovered as "deoiled wax." Thus, as is well known to all those familiar with the art, a solvent deoiled paraffin wax tends to be highly n-paraffinic in composition, assuming, of course, that the n-paraffinic components are originally present and the non-linear hydrocarbons present in the charge stock are of approximately the same molecular weight range as the linear components. This situation will usually prevail, since we are speaking of waxes to be derived from mixed-base petroleum distillate fractions. A distillate cut or fraction contains components of approximately the same molecular weight range since, in distilling a mixture of petroleum hydrocarbons, the separation based on differences in boiling point also results in a separation roughly according to molecular weight.

Thus, solvent deoiling or sweating of the preferred type slack waxes tends to eliminate non-normal paraffins while producing an oil-free wax which is highly n-paraffinic in composition. Typically, the urea adductible content of such a wax is at least 90% and often 95% or higher. The waxy material, relatively rich in isoparaffins, which has been removed in the above operations may be utilized as fuel components or as cracking feed stock or in production of lower melting waxes, or it may be recycled in some manner so that substantial amounts remain in the higher melting wax product. However, ordinary manipulations by which these lower melting components might be returned to admixture with the higher melting wax will not insure an improvement in gloss properties of the higher melting wax, and may actually act to the contrary. For example, the filtrate, or foots oil, streams from solvent deoiling operations may be combined and in turn solvent deoiled to recover a relatively oil-free wax of lower melting point and of somewhat higher non-normal paraffin content than the high melting wax. This lower melting wax can be blended in various amounts into the higher melting wax but gloss properties will not necessarily be improved.

In another example of unfruitful procedure, the preferred slack wax or preferred blend of slack waxes can be so deoiled that more than usual of the non-normal components remain in the oil-free wax. This can be done merely by carrying out the deoiling operations at lower temperature than usual and, if necessary, repeating this lower temperature deoiling step a greater number of times than usual. But this does not insure either the desired gloss or hardness. If the deoiling temperature is low enough to retain the desired low melting isoparaffins, an undesirably large proportion of low-melting n-paraffins is retained. This does not provide the desired gloss improvement and it also softens the wax excessively, creates scuffing and blocking problems, and results in a wax of little value for the previously mentioned uses.

To insure obtaining the desired gloss and gloss stability, together with good hardness, blocking resistance and scuff resistance, it is important to select a particular normal paraffin wax and a particular isoparaffinic wax. The normal paraffin wax, which represents the base wax of the composition of the present invention is a hard, highly paraffinic wax i.e. usually containing on the order of at least 90% by weight n-paraffins, preferably at least 95% n-paraffins, 95% by weight of which exhibits a breadth of carbon number distribution that falls within the range of about 8 to 11 carbons, that is, of no more than 11 and no less than 8 carbons. In addition no more than about 5% by weight of the wax consists of molecules lighter than $C_{24}$ or heavier than $C_{35}$. The melting point of the wax falls within the range of about 130 to 145° F., preferably about 135 to 140° F.

The n-paraffin wax component of the composition of the present invention can be conveniently obtained by severe solvent deoiling of the primary slack wax obtained by solvent dewaxing waxy distillates boiling in the range of about 650° F. to 900° F. at 760 mm. pressure derived, for instance, from mixed base or Mid-Continent crude oils. Higher boiling distillate cuts, e.g. with an end point of about 1050° F. or more often produced in the course of petroleum refining operation have not been found to be a suitable source for the n-paraffin wax of the present invention. These heavier distillates generally yield wax containing a substantial amount of high melting non-normal paraffins and use of this wax in the composition of the present invention often causes a very deleterious effect on gloss stability.

The isoparaffin wax component of the present invention is a wax relatively rich in isoparaffins (branched chain paraffins) falling within the $C_{23}$ to $C_{34}$ range. The isoparaffin content of the wax will vary depending on the specific nature of the crude oil from which it is obtained and the specific conditions used in its preparation but will ordinarily be greater than about 10% by weight, generally about 10 to 50% or more with at least about 90% by weight of the isoparaffins falling within the $C_{23}$ to $C_{34}$ range. The wax has a melting point of up to about 115° F., preferably about 105 to 110° F. and any n-paraffinic content that may be present should be predominantly less than $C_{25}$ and greater than $C_{20}$ in order neither to unduly interfere with the effect of the isoparaffins nor unduly soften the wax.

An isoparaffinic wax suitable for use in the composition of the present invention can be conveniently prepared from the same waxy distillates or a portion thereof, used to produce the n-paraffinic base wax component. The slack wax from such distillates is usually subjected to two or three deoiling operations to produce the substantially oil-free n-paraffinic base wax of the present invention. The filtrate product from the first of these deoilings is segregated and further processed to yield the desired isoparaffin wax, this processing consisting essentially of subjecting the first filtrate, or first foots oil to an additional solvent deoiling operation under such conditions that substantially all of the oil is removed and the desired low melting isoparaffinic waxes remain. Oil content remaining in the isoparaffinic wax should be low—no more than about 2% as measured by ASTM D721–56T. The isoparaffin content of the above wax will normally be in the range of about 10 to 50% but may be further increased if desired by, for example, treating the wax with urea or by removing additional n-paraffins by solvent fractionation. This results in a wax which is more effective in producing improved gloss properties, but the additional purification steps may not be warranted providing the n-paraffins remaining admixed with the isoparaffins are within the defined molecular range.

The following examples are included to illustrate preparation of the wax components of the present invention but are not to be construed as limiting. Any methods or processing operations known to the art which produce n-paraffin wax and isoparaffin wax having the defined properties can be employed.

EXAMPLE I

By conventional vacuum distillation of a Mid-Continent crude, a waxy distillate was prepared having a 10–90% distillation range of 780–880° F. This distillate was dearomatized by conventional phenol treating and dewaxed to produce +10° F. pour point oil by conventional solvent dewaxing by low temperature precipitation from MEK-toluene solution. The resulting slack wax was subjected to two successive solvent deoiling steps, using conventional MEK-toluene deoiling, at 50° F. temperatures to produce a first foots oil, a second foots oil, and a hard, oil-free, highly n-paraffinic wax of 143° F. melting point designated as Base A. A second foots oil, containing principally n-paraffins with some iso-paraffins and occluded oil, was rejected. The first foots oil, containing occluded oil, low melting n-paraffins, and of more importance, a relatively high percentage of waxy isoparaffins, was subjected to conventional solvent deoiling at 10° F., resulting in a foots oil product which was rejected, and a wax of 112° F. melting point, rich in waxy, low-melting, iso-paraffinic compounds, designated as Foots Wax A. Foots Wax A was relatively free of occluded oil, testing only 1.5% oil by ASTM D721–56T. Properties and use of these waxes will be discussed below.

EXAMPLE II

Additional examples of component waxes were prepared by processing a waxy distillate, similar in source to that of Example I, and having a 10–90% distillation range of 660–790° F., using the same techniques described in Example I to produce a hard, highly n-paraffinic wax of 130° F. melting point designated as Base B. Here again, the second foots oil stream was rejected as containing undesirable components and the first foots oil stream was solvent deoiled at 10° F. to produce a rejected oily filtrate and a substantially oil-free Foots Wax B of 110° F. melting point, rich in isoparaffinic wax. Properties and use of these component waxes will be discussed below.

EXAMPLE III

Additional examples of component waxes were prepared by blending Base A and Base B in various proportions to provide hard, highly n-paraffinic base waxes of various molecular range and melting point. Blends containing about 70–75 parts Base A and 25–30 parts Base B, resulting in a melting point of about 138–140° F. resulted in a preferred type base wax. These will be discussed below.

EXAMPLE IV

A portion of first foots oil from Example I was combined with an equal quantity of first foots oil from Example II and the resulting blend was solvent deoiled at 10° F. with MEK-toluene (45:55 MEK-toluene by volume) to give a rejected oily filtrate and a substantially oil-free Foots Wax C of 109.7° F. melting point, rich in isoparaffinic wax. Use of this component wax will be covered below.

EXAMPLE V

A waxy distillate, similar in source to that of Example I, but having a 10–90% distillation range of 850–1050° F., was processed using the same techniques and sequence used in Example I to produce a hard, oil-free wax of 152.5° F. melting point designated as Base D. Base D differed from earlier prepared Base A and Base B in having a somewhat lower n-paraffin content as well as higher molecular weight and melting point. Base D was found to be not suitable as a component in the desired waxes, as will be illustrated below.

EXAMPLE VI

The second foots oil streams from Examples I and II, rejected for previous work were blended in equal amounts and solvent deoiled at 10° F. to give a rejected oily filtrate and a substantially oil-free Foots Wax E of 120.5° F. melting point. Foots Wax E contained appreciable isoparaffinic as well as n-paraffinic wax content, but was found not suitable as a component in the desired waxes, as will be illustrated below.

Composition and properties of the various component waxes were determined by means of vapor phase chromatography, mass spectrometry, and other indicated tests. Pertinent results are summarized in Table I below.

*Table I*

| | Melting pt.,° F., ASTM D87-57 | Iso-alkanes, wt. percent | Carbon No. range [1] | | Percent oil, ASTM D721-56T | Molecular wt., ave. |
|---|---|---|---|---|---|---|
| | | | n-alkanes | Iso-alkanes | | |
| Foots Wax A | 112.1 | 30 | 21–25 | 23–33 | 1.6 | 340 |
| Foots Wax B | 110.0 | 26 | 20–25 | 23–29 | 1.5 | 320 |
| Foots Wax C | 109.7 | 30 | 20–25 | 23–33 | 2.0 | |
| Foots Wax E | 120.5 | 28 | 21–31 | 24–32 | 0.5 | 345 |
| Base A | 143.2 | 5 | 25–33 | 30–33 | 0.0 | 400 |
| Base B | 129.5 | 5 | 23–30 | 27–30 | 0.0 | 335 |
| Blend Base A and Base B (70:30) | 139.0 | 5 | 24–33 | | 0.0 | 380 |
| Base D | 152.5 | [2] 25–30 | 25–38 | 28–38 | 0.4 | 450 |

[1] 95% by weight within these inclusive limits.
[2] Includes substantial cyclo-paraffin content.

Various finished wax blends were prepared by combining component waxes and filtering the blends through activated bauxite to remove traces of colored or odorous impurities. Composition and properties of pertinent blands are summarized in Table II.

gloss of broadening the range of the base wax to include higher hydrocarbons including non-linear types which are normally present in relatively greater amounts in the region of about $C_{34}$ and higher.

All blends illustrating the compositions of the invention

*Table II*

| Finished wax No. | 1 | 2 | 3 | 4 | 5 | 6 | 7 | 8 | 9 | 10 | 11 | 12 | 13 |
|---|---|---|---|---|---|---|---|---|---|---|---|---|---|
| Composition, wt. percent: | | | | | | | | | | | | | |
| Foots Wax A | | | | | | | 5 | | | 3 | | | |
| Foots Wax B | | | | | 5 | 5 | | 5 | 2 | | | | |
| Foots Wax C | | | | | | | | | | | | 3 | 3 |
| Foots Wax E | | | | | | | | | | | | 3 | |
| Base A | 100 | | | 70 | | | 95 | 70 | 70 | 70 | 70 | 70 | 50 |
| Base B | | 100 | | 30 | | 95 | | 25 | 28 | 27 | 27 | 27 | 37 |
| Base D | | | 100 | | 95 | | | | | | | | 10 |
| Properties: | | | | | | | | | | | | | |
| Melting point (D87-57) | 143.2 | 129.5 | 152.5 | 139.0 | 150.0 | 128.4 | 141.5 | 137.6 | 138.2 | 138.0 | 138.0 | 138.7 | 137.5 |
| Penetration at 100° F. (D1321-57T) | 15 | 40 | 24 | 28 | 27 | 50 | 22 | 33 | 30 | 30 | 31 | 29 | 37 |
| Percent oil (D721-56T) | 0.0 | 0.0 | 0.4 | 0.0 | 0.5 | 0.1 | 0.1 | 0.2 | 0.1 | 0.1 | 0.1 | 0.1 | 0.1 |
| Blocking point (D1465-57T) | 115 | 102 | 132 | 108 | | 101 | 115 | 108 | 108 | 108 | 108 | 108 | 108 |
| Paper gloss, visual: | | | | | | | | | | | | | |
| Initial | Fair | Fair | Good | Good | Good | Good | Good | Exc. | Good | Good | Good | Good | Good |
| Aged 14 days | Poor | Poor | Fair | Poor | Poor | Good | Good | Exc. | Exc. | Exc. | Exc. | Poor | Poor |
| Paper Gloss (TAPPI T653-SM58): | | | | | | | | | | | | | |
| Initial | 19 | 27 | 30 | 28 | 31 | 28 | 28 | 34 | 31 | 30 | 31 | 29 | 33 |
| 7 days | 16 | 22 | 23 | 22 | 21 | 29 | 30 | 40 | 35 | 36 | 36 | 23 | 25 |

The data of Table II illustrate the striking improvement in gloss which can be obtained by the use of the improved wax compositions of the present invention. None of the four "base wax types," represented by Waxes 1–4, show good gloss behavior. However, three of these base waxes (Waxes 1, 2, and 4) can be used in the improved compositions of this invention. Blends of Base A and Base B make the preferred type base. Waxes 8–11 are examples of generally preferred compositions. All of these show needle penetration values at 100° F. of well under 40—a value which can be taken to differentiate soft from hard waxes. Blocking point has not been sacrificed to achieve good gloss. Blocking point of the best quality waxes within the 135–140° F. melting point range is normally 105–110° F. (note Wax 4).

Wax 12 illustrates the use of an unsuitable type of foots wax (Foots Wax E) with a suitable base wax. Because Foots Wax E is rather similar in composition to the suitable foots waxes, it might logically be expected that Foots Wax E would be a suitable component in the high gloss waxes. Unexpectedly, this is not the case. The reason appears to lie in the presence of excessive amounts of n-paraffins, particularly $C_{24}$ and $C_{25}$, which contribute no benefit and, in some cases, interfere with desirable recrystallization habits of the lower melting isoparaffins. Wax 13 illustrates the deleterious effect on show a low oil content—well below the limit of 0.5% usually placed on so-called fully-refined paraffin waxes by petroleum wax producers.

We claim:
1. A wax composition of improved gloss and gloss stability characteristics consisting essentially of a normal paraffin wax having a melting point of about 130 to 145° F., 95% by weight of said wax exhibiting a breadth of carbon number distribution within the range of 8 to 11 and no greater than 5% by weight of said wax consisting of less than $C_{24}$ and greater than $C_{35}$ molecules, and about 0.5 to 10% by weight of an isoparaffinic wax having a melting point up to about 115° F. containing greater than about 10% by weight of isoparaffins at least about 90% by weight of which are within the $C_{23}$–$C_{34}$ range.

2. The composition of claim 1 wherein the melting point of the isoparaffinic wax is about 105 to 110° F.

3. The composition of claim 1 wherein the isoparaffinic wax is present in an amount of about 2 to 8% by weight.

References Cited in the file of this patent

UNITED STATES PATENTS

| 2,670,323 | Hunter et al. | Feb. 23, 1954 |
| 2,915,447 | Arabian | Dec. 1, 1959 |
| 2,967,817 | Marple et al. | Jan. 10, 1961 |